United States Patent
Hwang et al.

(10) Patent No.: US 10,172,141 B2
(45) Date of Patent: Jan. 1, 2019

(54) SYSTEM, METHOD, AND STORAGE MEDIUM FOR HIERARCHICAL MANAGEMENT OF MOBILE DEVICE NOTIFICATIONS

(71) Applicant: International Business Machines Corporation, Armonk, NY (US)

(72) Inventors: Inseok Hwang, Austin, TX (US); Su Liu, Austin, TX (US); Eric J. Rozner, Austin, TX (US); Chin Ngai Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/423,363

(22) Filed: Feb. 2, 2017

(65) Prior Publication Data

US 2018/0220427 A1 Aug. 2, 2018

(51) Int. Cl.
*H04W 72/06* (2009.01)
*H04W 4/12* (2009.01)
*H04W 4/06* (2009.01)

(52) U.S. Cl.
CPC .............. *H04W 72/06* (2013.01); *H04W 4/06* (2013.01); *H04W 4/12* (2013.01)

(58) Field of Classification Search
CPC .......... H04W 72/06; H04W 4/06; H04W 4/12
USPC ........................................ 455/450, 512, 518
See application file for complete search history.

(56) References Cited

U.S. PATENT DOCUMENTS

| | | |
|---|---|---|
| 8,000,692 B2 | 8/2011 | Abel et al. |
| 8,483,772 B2 | 7/2013 | Naftolin |
| 8,958,776 B2* | 2/2015 | Boland ................ H04L 63/102 455/414.1 |
| 9,172,787 B2 | 10/2015 | Kemmler et al. |
| 9,288,164 B2 | 3/2016 | Vyrros et al. |
| 9,743,381 B1* | 8/2017 | Alam .................... A61B 5/0482 |
| 9,935,686 B2* | 4/2018 | Yoon ...................... H04B 3/544 |
| 2002/0072980 A1* | 6/2002 | Dutta ..................... G06Q 30/06 705/26.62 |

(Continued)

FOREIGN PATENT DOCUMENTS

WO 2009092061 A1 7/2009

OTHER PUBLICATIONS

IBM "Providing Help and Suggestions for Wizard Based Tasks Via 'Wisdom of the Crowds'", IP.com, IPCOM000160886D, Dec. 3, 2007, 3 pages.

(Continued)

*Primary Examiner* — Congvan Tran
(74) *Attorney, Agent, or Firm* — Kunzler, PC

(57) ABSTRACT

A system includes a notification controller including one or more processors, and a memory storing code that is executable by the notification controller to determine a context for a plurality of mobile devices. The system further determines, for the context, a hierarchical ranking for the plurality of mobile devices, wherein a first mobile device of the plurality of mobile devices is higher-ranked than at least one second mobile device of the plurality of mobile devices, and communicates a command selected by a higher-ranked first mobile device to modify one or more notification settings of the at least one second mobile device that is lower-ranked than the first mobile device. Methods and a program product corresponding to the system are also included.

20 Claims, 6 Drawing Sheets

(56) References Cited

U.S. PATENT DOCUMENTS

| | | |
|---|---|---|
| 2007/0238475 A1* | 10/2007 | Goedken ............. H04M 1/7253 |
| | | 455/512 |
| 2009/0325566 A1 | 12/2009 | Bell et al. |
| 2014/0297758 A1 | 10/2014 | Kidron et al. |
| 2015/0133098 A1 | 5/2015 | Warr |
| 2015/0237483 A1* | 8/2015 | Shimizu .................. H04W 4/10 |
| | | 455/512 |
| 2015/0304406 A1 | 10/2015 | Penilla et al. |
| 2016/0050642 A1 | 2/2016 | Brown et al. |
| 2016/0248865 A1 | 8/2016 | Dotan-Cohen et al. |
| 2016/0371655 A1* | 12/2016 | Cheng ................ G06Q 10/1095 |
| 2017/0155941 A1* | 6/2017 | Rieger ............. H04N 21/25825 |

OTHER PUBLICATIONS

"Flash Crows Notifications for Thunderstorm Watches and Warnings in Cloud Computing" IP.com, IPCOM000227437D, May 8, 2013, 4 pages.

"Intelligent Notification System Based on Crowd Sourcing and Current Activities" IP.com, IPCOM000230074D, Aug. 17, 2013, 3 pages.

\* cited by examiner

400

| User Profile 402 |
|---|
| Identification 404 |
| Name 406 |
| Device ID 408 |
| Notification 410 |
| Group 412 |
| Rank 414 |
| Thresholds 416 |
| Usage 418 |
| History 420 |
| Preferences 422 |

| Device State 440 |
|---|
| Location 442 |
| Notification Settings 444 |
| Mute 446 |
| Vibrate 448 |
| Visual 450 |
| Brightness 452 |
| Audio 454 |
| Volume 456 |
| Date/Time 458 |
| Sensor Input(s) 460 |
| Application state 462 |
| Communication state 464 |

SYSTEM, METHOD, AND STORAGE MEDIUM FOR HIERARCHICAL MANAGEMENT OF MOBILE DEVICE NOTIFICATIONS

FIELD

The subject matter disclosed herein relates to notifications for mobile computing devices, specifically, a method and apparatus for hierarchical management of device notifications.

BACKGROUND

Mobile computing devices are popular among many users. Many mobile computing devices are capable of notifying a user of events, such as for example, incoming communications.

BRIEF SUMMARY

In one embodiment, a system is disclosed that includes a notification controller including one or more processors, and a memory storing code that is executable by the notification controller to determine a context for a plurality of mobile devices. The system further determines, for the context, a hierarchical ranking for the plurality of mobile devices, wherein a first mobile device of the plurality of mobile devices is higher-ranked than at least one second mobile device of the plurality of mobile devices, and communicates a command selected by a the higher-ranked first mobile device to modify one or more notification settings of the at least one second mobile devices that is lower-ranked than the first mobile device.

In one embodiment, a method is disclosed that includes determining a context for a plurality of mobile devices and determining, for the context, a hierarchical ranking for the plurality of mobile devices, wherein a first mobile device of the plurality of mobile devices is higher-ranked than at least one second mobile device of the plurality of mobile devices. In the embodiments of the system further includes communicating a command selected by the higher-ranked first mobile device to modify one or more notification settings of the at least one second mobile device that is lower-ranked than the first mobile device.

In one embodiment, a program product is disclosed. The program product includes a computer readable storage medium that stores code executable by one or more processors to perform: determining a context for a plurality of mobile devices. The code is further executable to determine, for the context, a hierarchical ranking for the plurality of mobile devices wherein a first mobile device of the plurality of mobile devices is higher-ranked than at least one second mobile device of the plurality of mobile devices. The code is further executable to communicate a command selected by the higher-ranked first mobile device to modify one or more notification settings of the at least one second mobile device that is lower-ranked than the first mobile device.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments, and are not, therefore, to be considered to be limiting of scope, the embodiments will be described and explained with additional specificity and detail through the use of the accompanying drawings, in which.

DETAILED DESCRIPTION

Figure 1:
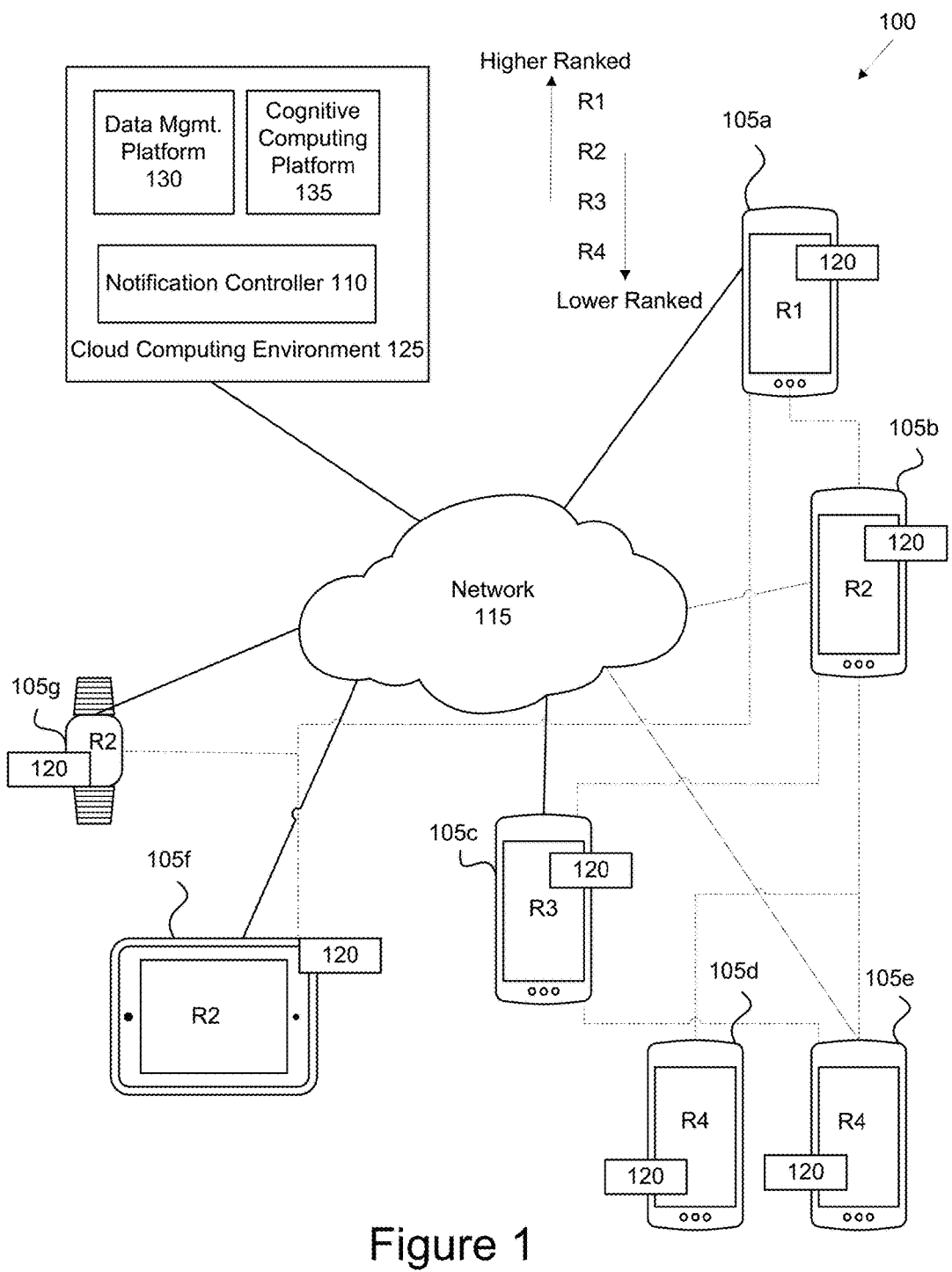
FIG. 1 is a schematic block diagram illustrating one embodiment of a system for hierarchical management of mobile device notifications.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code referred hereafter as code. The storage devices may be tangible, non-transitory, and/or non-transmission. The storage devices may not embody signals. In a certain embodiment, the storage devices only employ signals for the accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which executes on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It may also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements. As used herein, the word substantially is a term of approximation that means nearly unless otherwise clear from the context.

FIG. 1 is a schematic block diagram illustrating one embodiment of a system for hierarchical management of mobile device notifications. The system 100 improves mobile device notification technology by providing components and methods that address deficiencies in existing mobile device systems, such as for example, the deficiency that in existing systems, individual mobile devices may have notification settings that allow notifications to occur in a way that disrupts a particular event at a particular venue.

In existing mobile device environments, each mobile device may have notification settings that a user sets to determine whether or not a notification that may be perceptible to other users of mobile devices in a particular venue. However, at a particular event, a user may forget to change settings to those appropriate for the event, thus causing a disruption when a notification is received.

Moreover, the user may be unaware of the expectations of a person in charge of a particular event. If a notification is received in a way that interrupts an event, in existing systems, an organizer may tell users attending the event that the person in charge desires all mobile devices present to have their notifications settings set so as not to interrupt the event. The system works to a certain degree and is accepted by many people in charge of, or attending, events.

However, if a person arrives late they may not receive the message and thus may have their mobile device settings inappropriately configured. Moreover, in some cases, a message is communicated by a person in charge of the event in response to an interruption caused by a notification received by an attendee of the event. This may cause further interruption and unwanted attention.

Thus, system 100 provides hierarchical management of mobile device notifications whereby an administrator may quietly and unobtrusively use his or her mobile device to communicate a command to mobile devices at a particular venue and/or a particular event.

In one embodiment, the system 100 includes a notification controller 110 that may be part of a cloud computing environment 125. The cloud computing environment 125 may include a data management platform 130 and/or a cognitive computing platform 135. In one embodiment, the notification controller 110 includes one or more processors and a memory storing code that is executable by the notification controller 110 to determine a context for a plurality of mobile devices, such as for example, mobile devices 105a, 105b, 105c, 105d, 105e, 105f, and 105g.

The mobile devices 105a-105e are depicted as smartphones to illustrate an example embodiment of the system 100. The mobile devices 105 may be other types of mobile devices such as a tablet as depicted in mobile device 105f. A mobile device 105g may be a wearable device such as a smartwatch, augmented reality eyeglasses, and so forth. The particular depictions of the types of mobile devices 105 is merely illustrative and any type of mobile device 105 may be used interchangeably within the system 100. Each of the mobile devices, e.g., 105a-105g, communicate over a network 115 by a wireless connection.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

In some embodiments, one or more of the mobile devices 105, e.g., 105a-105g may include a notification control app 120. As used herein, the term app refers to an application, unless otherwise clear from context. In some embodiments, an app may be built into an operating system of the mobile device. In other embodiments, an app may refer to an application that is installed separately from the operating system and that communicates with the operating system.

Although FIG. 1 depicts each of the mobile devices 105 as including a notification control app 120, in some embodiments, the mobile devices 105 may not include a notification control app 120. The system 1 may still the operation of mobile devices 105 that do not include a notification control app 120. For example, the system may communicate with such mobile devices 105 using, for example, text messaging, email, visual messaging, and other programs already in the mobile devices 105.

In one embodiment, the notification controller 110 determines a context for the mobile devices 105. For example, the notification controller 110 may determine the context for the mobile devices by communicating with the data management platform 130 and the cognitive computing platform 135 which may include cloud services.

Various cloud computing platforms 135 are available from different vendors. For example, IBM® Bluemix® provides a platform for the intersection of device communications and cognitive computing. IBM® Bluemix® provides tools, services, and infrastructure that may be used to contextualize data in the system 100. In some embodiments, cognitive computing services such as IBM® Watson' services may work in conjunction with Bluemix® services. More details regarding elements that are included in a context are provided below with respect to the description of FIG. 4.

The notification controller 110 determines, for the context, a hierarchical ranking for the mobile devices, e.g., 105a-105g. As used herein, hierarchical refers to an arrangement in which each of the mobile devices 105 included in the hierarchical ranking is represented as being higher-ranked, lower-ranked, or having the same rank as the other mobile devices 105. For example, in one embodiment, the hierarchical ranking may include discrete ranks, such as for example, R1, R2, R3, R4. In the exemplary embodiment depicted in FIG. 1, R1 is higher-ranked than R2, R2 is higher-ranked than R3, and R3 is higher-ranked than R4.

In some embodiments, multiple mobile devices 105 may share the same rank. For example, in the embodiment depicted in FIG. 1, the mobile devices 105*d* and 105*e* both have a rank of R4 which is lower-ranked than R3, R2, and R1. The mobile devices 105*g* and 105*f* both have a rank of R2 which is lower-ranked than R1 but higher-ranked than R3 or R4. In other embodiments, the notification controller 110 may determine a hierarchical ranking in which no two devices share the same rank but are ranked in order.

In still further embodiments, the notification controller 110 may determine the hierarchical ranking of the mobile devices 105 based on a graph or a tree structure representation, such as for example a business organizational chart. In some embodiments, such as depicted in FIG. 1, the mobile device 105*a* may represent a root node of a hierarchical tree. The dashed lines connecting 105*a* and 105*b*, 105*f,* and 105*g* may represent links between nodes of the tree. Within the hierarchical tree, the mobile device 105*b* may be a child node to mobile device 105*a*, and a parent node to mobile devices 105*c*, 105*d*, and 105*e*. The mobile devices 105*d*, 105*e*, 105*f,* and 105*f* may be leaf nodes that do not have any children nodes.

With the hierarchical ranking determined, the notification controller 110 may communicate a command to modify one or more notification settings of one or more lower-ranked mobile devices, e.g., the mobile device 105*b*, 105*c*, 105*d*, 105*c*, 105*f,* and/or 105*g*. The command may be selected by a higher-ranked mobile device, e.g., the mobile device 105*a* having a higher rank in the hierarchical ranking e.g., R1 being higher-ranked than for example R2, R3, and R4, with R2 being higher-ranked than for example R3, R4, and so forth.

In some embodiments, the notification controller 110 includes code that when executed by the processor provides the command to modify the notification settings of lower-ranked devices for selection by the higher-ranked mobile device based on current notification settings of the plurality of mobile devices meeting a predetermined condition.

For example, if a majority of the mobile devices within a particular hierarchical group in a particular venue or particular event have the notification settings set to silent or set to be limited to a particular maximum brightness, the notification controller 110 may provide one or more example commands to a higher-ranked mobile device, e.g., mobile device 105*a*, for selection by a user of the higher-ranked mobile device. The notification controller 110 may send a message to the user of the higher-ranked mobile device along the lines of "most of the mobile devices in this venue are in silent notification mode, do you wish to send a command to the lower-ranked devices you administer to set them in silent notification mode?"

In some embodiments, the notification controller 110 may communicate a command selected by the mobile device 105*b* which has a hierarchical rank of R2 to one or more lower-ranked devices, e.g., 105*c*, 105*d*, and/or 105*e*. In some embodiments, a mobile device such as the mobile device 105*g* with hierarchical rank R2 may not communicate a command to modify notification setting of other devices also having hierarchical rank R2, or to devices that are higher-ranked e.g., R1.

In some embodiments, the hierarchical ranking is determined by the notification controller 110 based on information stored in a cloud computing environment 125. The hierarchical ranking associated with the devices may also be stored in the cloud computing environment 125. For example, the data management platform 130 may already include social media relationship data from devices such as LinkedIn® or Twitter®. A first mobile device, e.g., 105*a*, being used by a first used who is social media influencer may be higher-ranked than one or more second mobile devices being used by followers of the first user, e.g., 105*b*-105*g*, independently of other organizational affiliations outside the social media network.

In other embodiments, the hierarchical ranking may be stored in memory, such as nonvolatile memory in the mobile devices 105.

Figure 2:
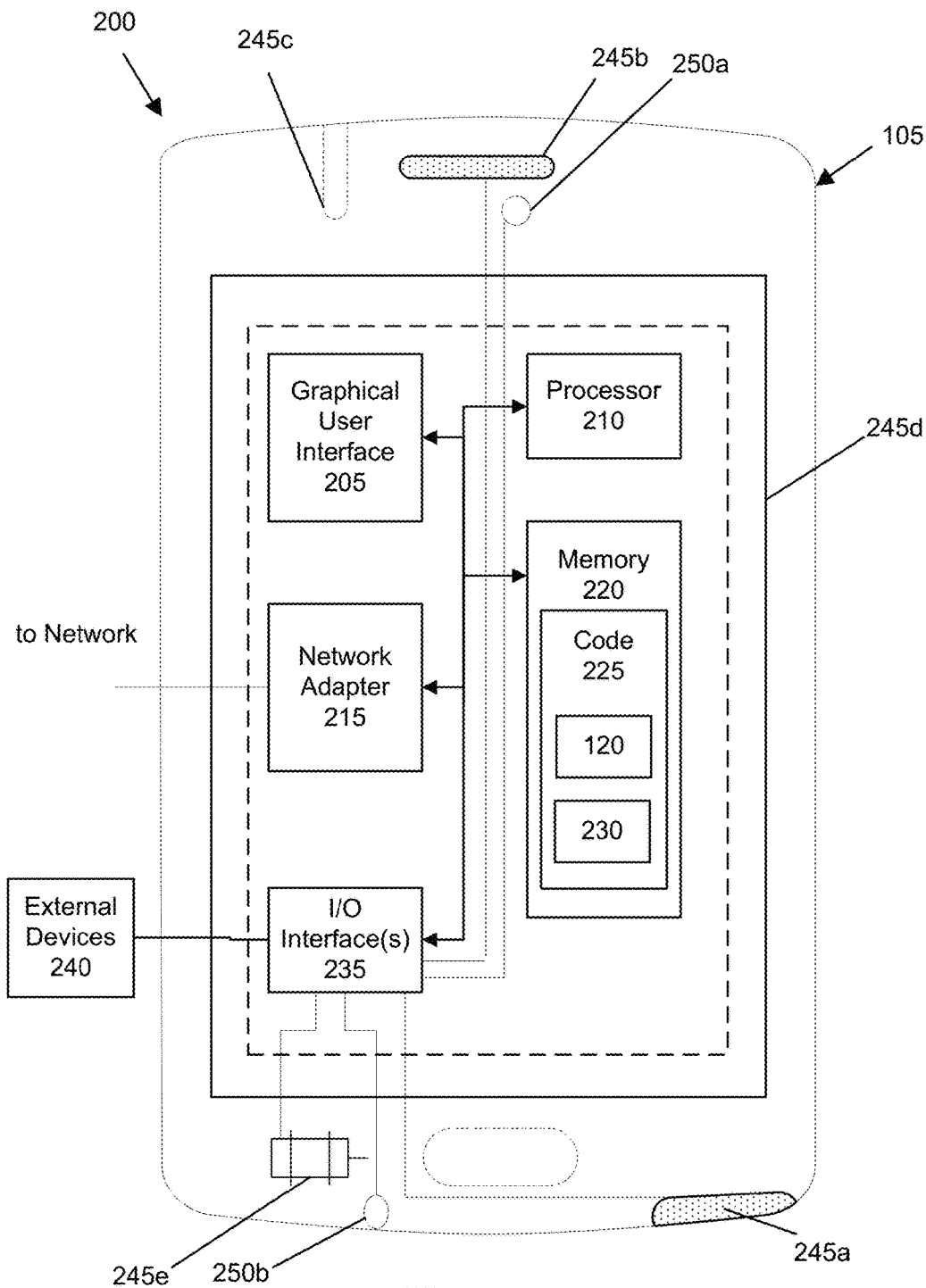
FIG. 2 is a schematic block diagram illustrating one embodiment of a mobile device for the system of FIG. 1.

FIG. 2 is a schematic block diagram illustrating an embodiment 200 of a mobile device 105 for the system 100 of FIG. 1. In some embodiments, the mobile device 105 includes a graphical user interface 205 and a network adapter 215 that connects to a network, e.g., network 115. In the embodiment 200, the mobile device 105 includes a processor 210 that communicates with a memory 220 which may include code 225. The code 225 may include an operating system as well as various apps that communicate with the operating system. In some embodiments, the memory 220 includes a notification control app 120. The notification control app 120 may be a separately installed app or the notification control app 120 may be built into the operating system.

In some embodiments, the mobile device 105 includes notification I/O devices 245 which may include, for example, a speaker 245*a*, an earpiece 245*b*, a headphone jack 245*c*, a display screen 245*d*, and/or a vibrating transducer 245*e*. The notification I/O devices 245 may be activated by the processor 210, for example through I/O interface 235. In some embodiments, the I/O interfaces 235 connect to external devices 240. For example, a smartphone may connect to a smartwatch and a stylus may connect to a tablet.

When the mobile device 105 receives a new message, for example, an email message, a text message, and/or an application message. In response, a notification may be made by activating one or more of the notification I/O devices 245, e.g., a speaker 245*a*, an earpiece 245*b*, a headphone jack 245*c*, display 245*d*, and/or a vibrating transducer 245*e*. A notification provides an audible, visual, and/or sensory notification that a particular event or condition has occurred. For example, if an incoming call or message is detected, one or more audio sounds such as a ringtone or a notification chime may be played through the speaker 245*a*, the earpiece 245*b*, or the headphone jack 245*c*.

The notification settings 230 may be used to control which of the one or more notification I/O devices 245 is activated. For example, the notification control app 120 may read the notifications settings 230 of one or more mobile devices in response to an event or condition that is programmed to produce a notification and activate selected notification I/O devices 245 based on the notification settings 230.

In some embodiments, a vibrating transducer 245*e* may be activated to produce a haptic feedback notification. As used herein haptic feedback or haptics refers to the use of the sense of touch in a user interface design to provide information to an end-user. In other embodiments, visual notifications may be provided. For example, a display screen 245*d* may flash or change brightness. The display screen 245*d* may also display a message, for example in a predetermined area of display screen 245*d* configured to display notifications.

In some embodiments, the mobile device 105 may include one or more input devices 250 such as an optical sensor 250*a* which may be, for example, a camera. In some embodiments, the optical sensor 250*a* may be a front facing camera or a rear facing camera or in other embodiments may be a light sensor that detects an ambient light level. In some embodiments, the input devices 250 may include an audio sensor 250*b*, such as for example, a microphone. The audio sensor 250*b* may be used to detect sounds including, for example, an ambient noise level.

In some embodiments, the notification control app 120 may receive an input from an input device 250 such as optical sensor 250*a* or audio sensor 250*b* in order to determine how to program and/or respond to the notification settings 230. For example, the notification control app 120 may determine from reading the audio sensor 250*b* that an ambient noise level is very low and an ambient light level is relatively bright.

In some embodiments, the notification controller 110 may alter a command to modify the notification settings in response to determining that a notification from at least one second mobile device, that is lower-ranked than the first mobile device, falls below a predetermined threshold of detectability at the higher-ranked first mobile device that selects the command.

In some embodiments, the notification controller 110 alters the command to modify the notification settings 230 to include an optimized volume setting for the context. For example, if the background noise is determined to be more than nominal, an audible notification at one or more of the lower-ranked devices may not be detectable at the higher-ranked by selecting the command because the high background noise level effectively masks the audible notification.

The system 100 may include code for iteratively sending a command to be selected by a higher-ranked device to modify a notification volume setting of one or more lower-ranked devices. The notification controller 110 may then send a command to the lowering device to activate a notification I/O device 245 at a given notification volume. The notification controller 110 may then cause the higher-ranked mobile device to activate a notification I/O device 245 such as an audio sensor 250*b* e.g., a microphone to determine whether the audible notifications being activated at the lower-ranked devices, e.g., 105*f*, 105*d*, are detectable at the audio sensor 250*b* e.g., a microphone, of the higher-ranked device, e.g., 105*a*.

Various optimization methods and algorithms such as iterative binary search methods, interval halving methods and the like may be used to quickly and efficiently determine the maximum volume of a notification that falls below a predetermined threshold of detectability at the higher-ranked mobile device. For example, in an auditorium or large classroom the notification controller 110 may determine that mobile devices 105 on the front row need a low notification volume setting.

In some embodiments, the notification controller 110 may use training to determine the appropriate volume levels. For example, prior to a live event, a simulated event using an exemplary first mobile device 105*a* that selects a command to modify notification settings on one or more second mobile devices, e.g., 105*b*-105*g*. In a simple example, the one or more second mobile devices may be position at various distances from the first mobile device. The first mobile device 105*a* may select a command to set the notification volume of the second mobile device 105*g* farthest from the first mobile device 105*a* to 50% maximum volume.

Then the first mobile device 105*a* may send a message to cause the second mobile device 105*g* to generate a notification. If the first mobile device 105*a* does not detect the notification, it can select a command that increases the volume to 75% of maximum volume. If the first mobile device 105*a* detects the notification generated at mobile device 105*g*, the first mobile device 105*g* may select a command to decrease the volume to 25% of maximum volume.

This interval having may be repeated, first for the second device 105*g* that is farthest for as many cycles to determine an optimal volume level that is readily detectable by the user of the second device 105*g* but that is not detectable by the user of the first device 105*b*. The training process may then be repeated for other mobile devices at different location. In some embodiments, the training may be done by a manufacturer to determine an optimal setting for a particular venue type.

Similarly, the mobile devices 105 on a back row may be able to be set at a higher notification volume setting while still falling below a predetermined threshold of detectability at for example the instructor's mobile device, e.g., 105*a*. Other mechanisms, such as modeling radio or sound wave propagation, can be used to estimate the intensity of a received notification at a given device based upon the volume of the notification at a second device.

A corresponding determination could be made for visual notification settings that set a maximum brightness of a screen for a particular event in a particular form. For example, if lights are dimmed at a forum a notification setting that controls the screen brightness of the mobile device e.g., 105*c*, 105*d*, 105*e*, may be set at a lower predetermined threshold value than if the lights at the forum were at full brightness.

The notification controller 110 may use this information in combination with the notification settings 230 to determine whether a visual signal such as a screen flash or a message displayed on the display screen 245*d* falls below a predetermined threshold of detectability at the higher-ranked mobile device such as 105*c* that selects the command to modify the notification settings of lower-ranked mobile devices 105 e.g., 105*d*, 105*d*. In other words, the notification controller 110 can determine whether the command selected by the higher-ranked mobile device to modify notification settings of lower-ranked mobile devices works effectively.

In some embodiments, the notification controller 110 communicates a command selected by a higher-ranked mobile device to modify the notification settings of one or more lower-ranked mobile devices with the command to modify the notification settings includes one or more notification settings selected from the group consisting of notification volume, notification brightness, and notification vibration.

Figure 3A:
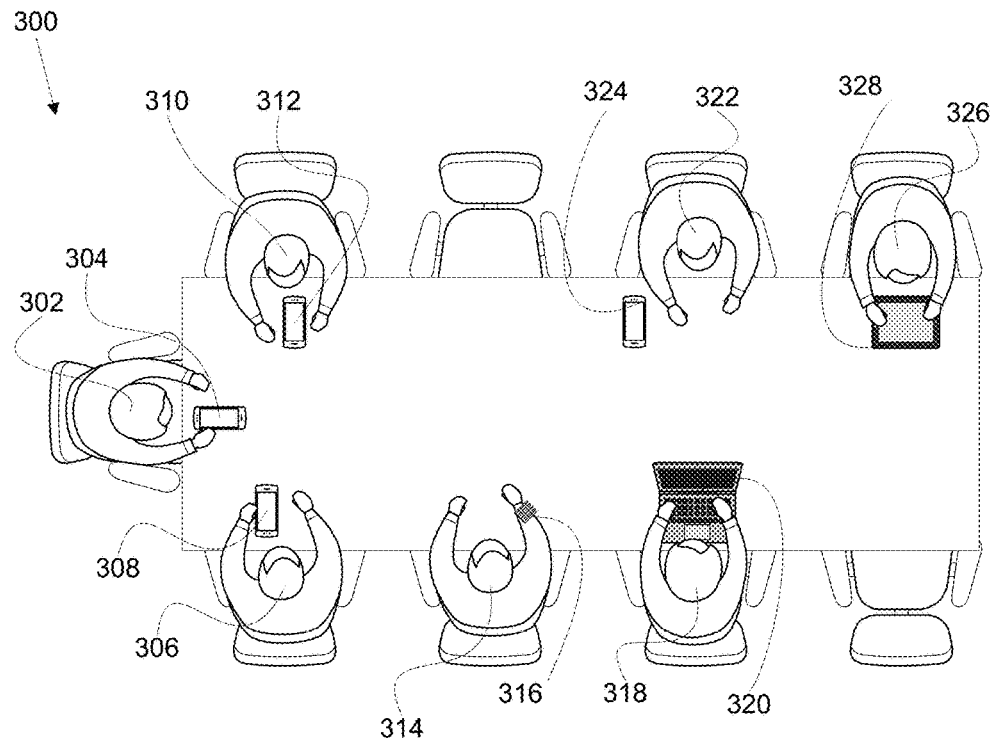
FIG. 3A is a schematic block diagram illustrating one embodiment of a system for hierarchical management of mobile device notifications in a first context.

FIG. 3A is a schematic block diagram illustrating one embodiment of a system 300 for hierarchical management of mobile device notifications in a meeting event/venue. In some embodiments, the system 300 operates substantially the same as system 100 described above with respect to FIG. 1. In some embodiments, the notification controller 110 determines the hierarchical ranking based on a predetermined relationship between a first user and one or more second users of the plurality of mobile devices.

Attending the meeting are seven users each with their own mobile devices. For example, a first user may be a president 302 of a company. She has a mobile device 304 such as a smartphone. A second user who is a vice president 306 reports to the president 302. Thus, based on the reporting relationship between the president 302 and the vice president 306, the notification controller 110 may determine a hierarchical rank of the mobile device 308 being used by the vice president 306 is lower-ranked than the mobile device 304 being used by the president 302.

A third user is a treasurer 310 who reports to the president and is an officer of the company. She is using a mobile device 312. The notification controller 110 may determine a hierarchical rank for mobile devices 312 based on the reporting relationship between that treasurer 310 and the president 302. The notification controller 110 may communicate information with the cognitive computing platform 135 to determine how to rank the treasurer 310 relative to the vice president 306.

In some embodiments, based on previous determinations or inputs that notification controller 110 may rank the mobile device 312 of the treasurer 310 at the same rank as the mobile device 308 belonging to the vice president 306. However, the mobile device 312 of the treasurer 310 may be lower-ranked than the mobile device 308 belonging to the vice president 306. If the notification controller 110 determines a ranking and one or more of the users chooses to alter that ranking they do so and the notification controller 110 which may include deep learning algorithms or other mechanisms such as profiles will be able to correctly rank mobile devices according to that relationship for the particular company in the future.

In some embodiments, the relationship between users may be input directly by one of the mobile device users. In other embodiments, the information may already exist for example in a company directory. The company directory may already exist in the cloud computing environment 125 or maybe be communicated to the cloud computing environment 125. The cognitive computing platform 135 may be useful to parse and determine the relationship between a group of users based on titles or other indicia of predetermined relationships.

Also attending the meeting is a manager 314 with a wearable mobile device 316. In some embodiments a wearable mobile device 316 may communicate with another mobile device such as a smart phone. The system 300 may in some embodiments, determine a ranking for each mobile device. In other embodiments, a mobile device such as a wearable mobile device 316 may be controlled by notification settings in a device to which it is connected.

The three remaining users attending the meeting are a first member of staff 318, a second member of staff 322, and and outside consultant 326. The mobile device 320 of the first member staff is a laptop while the mobile device 324 of the second member of staff 322 is a smartphone. The mobile device 328 of the outside consultant 326 is a tablet.

If the mobile device 324 is set to vibrate and it is laying on the table it may still greater disturbance if it vibrates during the meeting. Thus, the president 302 of the company may select a command to modify the notification settings of all mobile devices to be in a silent mode without vibrate during the time scheduled for the meeting or until she concludes the meeting and selects a new command to be sent from the notification controller 110 to the mobile devices, e.g., 304, 306, 310, 316, 324, 320, 328.

Because the mobile devices may be connected via a company network, the notification controller may provide a command for selection by a higher-ranking user regardless of whether the user is in the same location. For example, the lower-ranked user may be attending the meeting remotely by telephone and the higher-ranked user conducting the meeting may nevertheless to modify the notification settings of the remote user.

In some embodiments, the notification controller 110 may receive or read current notifications of mobile devices. For example, if the outside consultant 326 is expecting an urgent notification and has notification settings that are locked to prevent modification by the system the notification controller 110 may communicate those notification settings to a higher-ranked user who may be made aware of the situation.

The notification controller want 10 may provide a command for selection by the higher-ranking mobile devices based on current notifications settings of lower-ranked mobile devices that meet a predetermined condition. For example, in some embodiments, the manager 314 and the two members of staff 318, 322 are attending only part of the meeting.

As the users 314, 318, and 322 enter the room, the notification controller 110 may read or receive the current notification settings of the devices of those users already attending the meeting, e.g., 304, 308, 310, 328 being set to visual notification only. It may be noted that a mobile device such as wearable mobile device 316 may be higher-ranked than mobile devices 320, 324 at the same time it is lower-ranked than the mobile devices 304, 308, 312.

In one embodiment, the notification controller 110 may provide a command for selection by the higher-ranked mobile device, e.g., the wearable mobile device 316, of the manager based on the notification settings of the devices of those users already attending the meeting having the notification settings configured to limit notifications to visual notification in common. In some embodiments, the command based on the current notifications of other mobile devices may be provided at the time the manager enters the room.

The notification controller may detect the location of the mobile devices through determining to which network and access point they are connected to, or the location of the meeting scheduled in an electronic calendar, or by near field device communication between the mobile devices. These examples are merely to illustrate various ways in which for a particular venue and/or a particular event the notification controller may determine the location of the mobile devices.

Figure 3B:
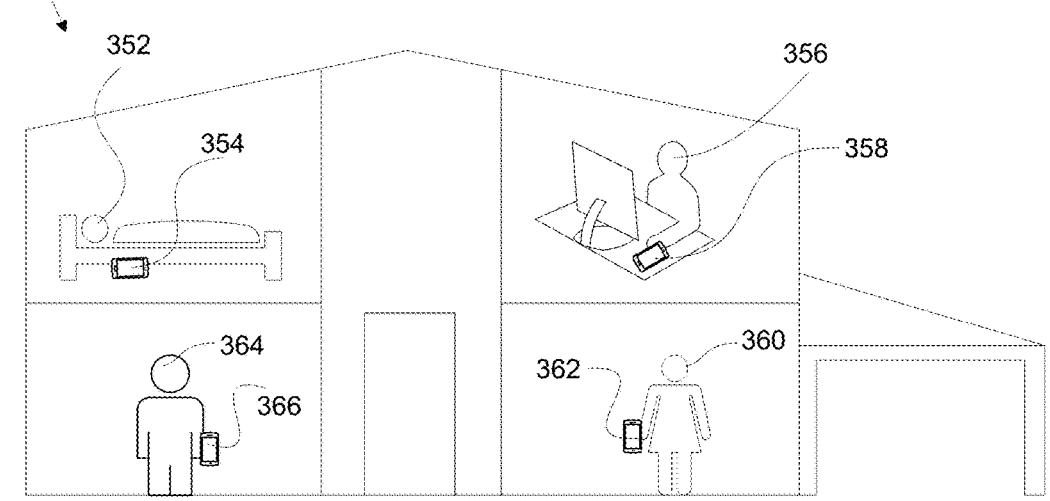
FIG. 3B is a schematic block diagram illustrating one embodiment of a system for hierarchical management of mobile device notifications in a second context.

FIG. 3B is a schematic block diagram illustrating another embodiment of a system 350 for hierarchical management of mobile device notifications. In the embodiment of the system 350, various members of a family are at home in a residential setting. A first parent 356 is working late in an upper floor office and has a mobile device 358 nearby. A second parent 352 with the mobile device 354 is resting in an upper floor bedroom to prepare for an early morning start. A son 364 with a mobile device 366 is in a ground-floor living room. A daughter 360 with a mobile device 362 is in a ground-floor dining room.

As previously described with respect to FIG. 1, the system 350 for hierarchical notification management may enable the first user to select command to modified notification settings of lower-ranked mobile devices. In the embodiment of 350, the mobile devices 354, 358 respectively belonging to the parents 352, 356 have a higher rank than the mobile device 366 of the son 364 and the mobile device 362 of the daughter 360.

In one embodiment, a mobile device 362 of the daughter 360 may be higher-ranked than the mobile device 366 of the son 364 based on a predetermined assignment of the rankings by the parents 352, 356 or by a predetermined factor such as the age of the daughter 360 being older than the age of the son 364.

Electronically, the mobile device 362 of the daughter 360 may be nearer in location to the mobile device 358 of the first parent 356. However, the first parent 356 may have previously used the system to determine that notification settings of a mobile device in the living room here the son is located may have any value because notifications in that room are unlikely to disturb a person working in the office. In contrast notification settings of mobile devices in the dining room immediately below the office may need to meet a predetermined condition, such as having a volume sufficiently low so as not to disturb a person working in the office above.

On the other hand the second parent 352 may have determined using the system that mobile devices in the living room below need to meet a predetermined condition of a maximum volume below that which is detectable by a person sleeping in the bedroom above. Or such criteria may need to be met at certain times of day. Thus the second parent 352 may use the mobile device 354 to select command to modify the notification settings of mobile device 366 based on factors such as proximity of location, the user of the mobile device, the time of day, and other context elements. In one embodiment, for example, the son 364 may have a mobile device 366 with a notification volume setting of 25% of maximum volume that is loud enough for the son 364 to hear, but not so loud in that it bothers the sleeping second patent 352. Similar notification settings may be selected to modify notification settings of mobile device 362 does not disturb first parent 356.

Figure 4:
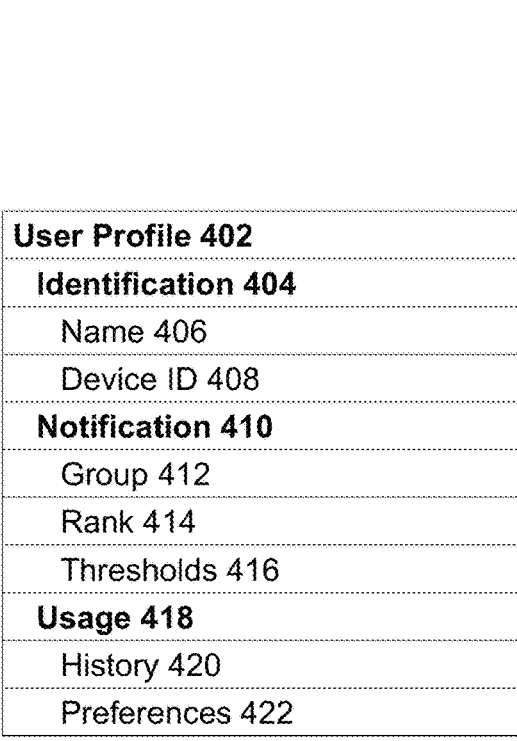
FIG. 4 depicts exemplary embodiments of a user profile and a device state for a context for the system of FIG. 1.

FIG. 4 depicts exemplary embodiments of a user profile and a device state for a context for the system of FIG. 1. In one embodiment, a context 400 for a particular mobile device includes a user profile 402 and a device state 440 for a plurality of mobile devices. The context 400 may be predetermined based on it being programmed by an administrator of the system or may be determined by elements of the user profile 402 and device state 440 for the plurality of mobile devices.

In some embodiments, the user profile 42 includes an identification 404 which may include a name 406 such as name of user of the mobile device. One user may have various mobile devices so the name itself may not be a unique identifier of a particular mobile device. The identification 404 may further include a mobile device ID 408 that is unique.

In some embodiments, the mobile device ID 408 may be, for example, an equipment serial number ("ESN"), a mobile equipment identifier ("MEID"), and international mobile equipment identity ("IMEI"), a subscriber identity module ("SIM"), a mobile serial number ("MSN"), or a personal identification number ("PIN"). An Android® tablet may have an Android ID, an iPad® tablet may have a unique device id ("UDID"), a laptop may have a unique media access control ("MAC") ID.

In some embodiments, The user profile 402 for the plurality of mobile devices may include notification fields 410. For example device may belong to a particular group 412. In some embodiments, a rank 414 for a particular group or set of mobile devices may be included. In some embodiments, notification thresholds 416 are stored to preserve thresholds relating to appropriate notification settings determined to meet predetermined criteria for detectability for a particular setting, venue, or event.

It may be noted that the user profile 402 may be stored in a cloud computing environment and/or in local storage on the plurality of mobile devices. Moreover, a particular mobile device may belong to more than one group 412 and may have a rank 414 that is different within different groups 412. In some embodiments, a particular user may have multiple user profiles 402 for different settings, venues, or events.

In some embodiments, a context 400 may further include information about a device state 440 of the plurality of mobile devices. The device state 440 may include a location 442 of a mobile device. This may be a real-time location such as determined by access point proximity or by a global positioning sensor of the mobile device.

The device state 440 may further include notification settings 444. The notification settings 444 may be both readable and writable. In some embodiments the notification controller receives information about the notification settings 444 for a particular device. Reading the notification settings 444 enables the notification controller 110 to provide a command for selection by a higher rank device based on current notification settings of the plurality of mobile devices.

In some embodiments, the notification settings 444 include a mute setting 446 which disables any audible or vibratory notification. In some embodiments, the visual notifications may be allowable if the mute setting 446 is enabled. Other settings may include vibrate setting 448. The vibrate setting 448 may be vibrate in conjunction with other notifications or may be, in other embodiments, vibrate only without other notifications.

Notification settings 444 may further include visual settings 450 such as for example, a brightness setting 452. In some venues or events that meet predetermined threshold of detectability may include a limit on the brightness setting 452. For example, in a presentation where the lights are dimmed.

In some embodiments, the notification settings 444 include audio notification settings 454. For example a volume setting 456 be readable to determine a current volume setting of the mobile device. The volume setting 456 may further be writable to limit the volume setting to meet a predetermined threshold of detectability, e.g., the volume may be set low enough so as not to be heard by a user of a higher-ranked device for particular venue or event.

In some embodiments the device state 440 further includes a time 458. The time 458 may be part of the context to determine appropriate settings for particular ranges of time. For example, a company may have designated a certain hour as silent notifications only our to enable employees to work undisturbed by notifications of other mobile devices.

In some embodiments, the device taper 40 further includes sensor inputs 460. For example an input from a light sensor or camera or an input from a microphone may be useful in determining a threshold of detectability for a higher-ranked device using the iterative algorithm described above to determine the level of volume for example which is detectable by a user of a hiring mobile device.

The device state 440 may further include other elements such as an application state 462. The application state may include a list of installed applications, active applications, and so forth by which the notification controller 110 may used to determine the context and/or the command to modify notification settings.

In some embodiments, the device state 440 for the plurality of mobile devices may further include a communication state 464. The communication state 464 may indicate or example whether the mobile device is currently connected to a Wi-Fi access point or two a mobile telephone network. The communication state 464 may be used by the notification controller 110 to help determine a context for the plurality of mobile devices.

It may be noted that various data elements of the user profile 402 and of the device state 440 need not all be present for any particular embodiment. Moreover, the elements depicted in FIG. 4 are exemplary and one of ordinary skill may recognize that other data elements may be considered part of a user profile 402 or a device state 440.

Thus by taking into account the user profiles 402 and/or the device state 440, the notification controller may determine a context appropriate for particular venue, event, group, or situation in which a user of a hiring mobile device may select a command to modify the notification settings of lower-ranked devices for a given context.

Figure 5:
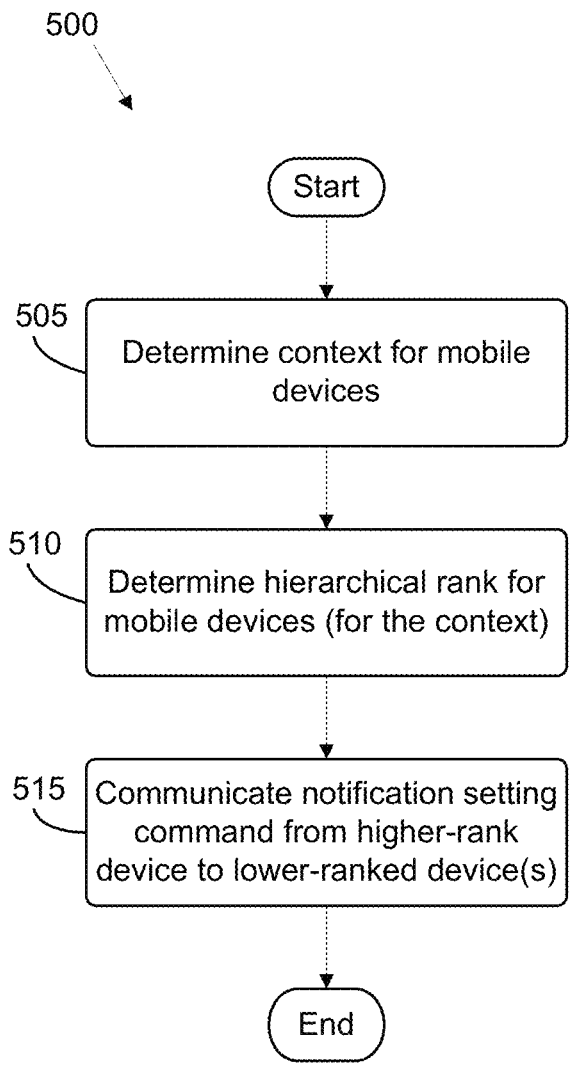
FIG. 5 is a schematic flow diagram of a method for hierarchically managing mobile device notifications.

FIG. 5 is a schematic flow diagram of a method 500 for hierarchically managing mobile device notifications. In one embodiment, the method 500 begins and includes determining 505 the context for a plurality of mobile devices. For example a notification controller in a cloud computing environment may access user profiles and device state data information for a plurality of mobile devices that are connected over a network to the cloud computing environment. The method 500 may determine the context by accessing and comparing current and/or historical data elements for a plurality of mobile devices having particular mobile device IDs or for particular users having user profiles stored and accessible by the cloud computing environment.

The method 500 further includes determining 510, for the context, a hierarchical ranking for the plurality of mobile devices in which a first mobile device of the plurality of mobile devices is higher-ranked than at least one second mobile device of the plurality of mobile devices. In some embodiments, determining 510 the hierarchical ranking may be based on receiving data input from an administrator of the system. In other embodiments, determining 510 the hierarchical ranking may be based on relationships between users of the plurality of mobile devices that is stored in a data management platform. In some embodiments, a cognitive computing platform analyzes data from the data management platform or from the plurality of mobile devices to determine the relationship, for example, by analyzing relationships stored in social networks, business networks, or other available data sources.

The method 500 further includes communicating 515 a command selected by the higher-ranked first mobile device to modify one or more notification settings of the at least one second mobile device that is lower-ranked than the first mobile device. A command for selection by a higher-ranked mobile device may be to modify notification settings of lower-ranked mobile devices to avoid disturbances caused by audible, visual, or vibratory notifications during a particular event or at a particular venue.

The method 500 may be implemented using any of the systems, components or actions described above with respect to FIGS. 1, 2, 3a, 3b, and/or 4. Thus method 500 improves the technology of mobile device notification by providing a way whereby a particular organization or group of users may set an appropriate notification policy for a given event or venue that avoids the deficiencies of existing systems which rely on the users themselves to modify notification settings for individual devices.

Figure 6:
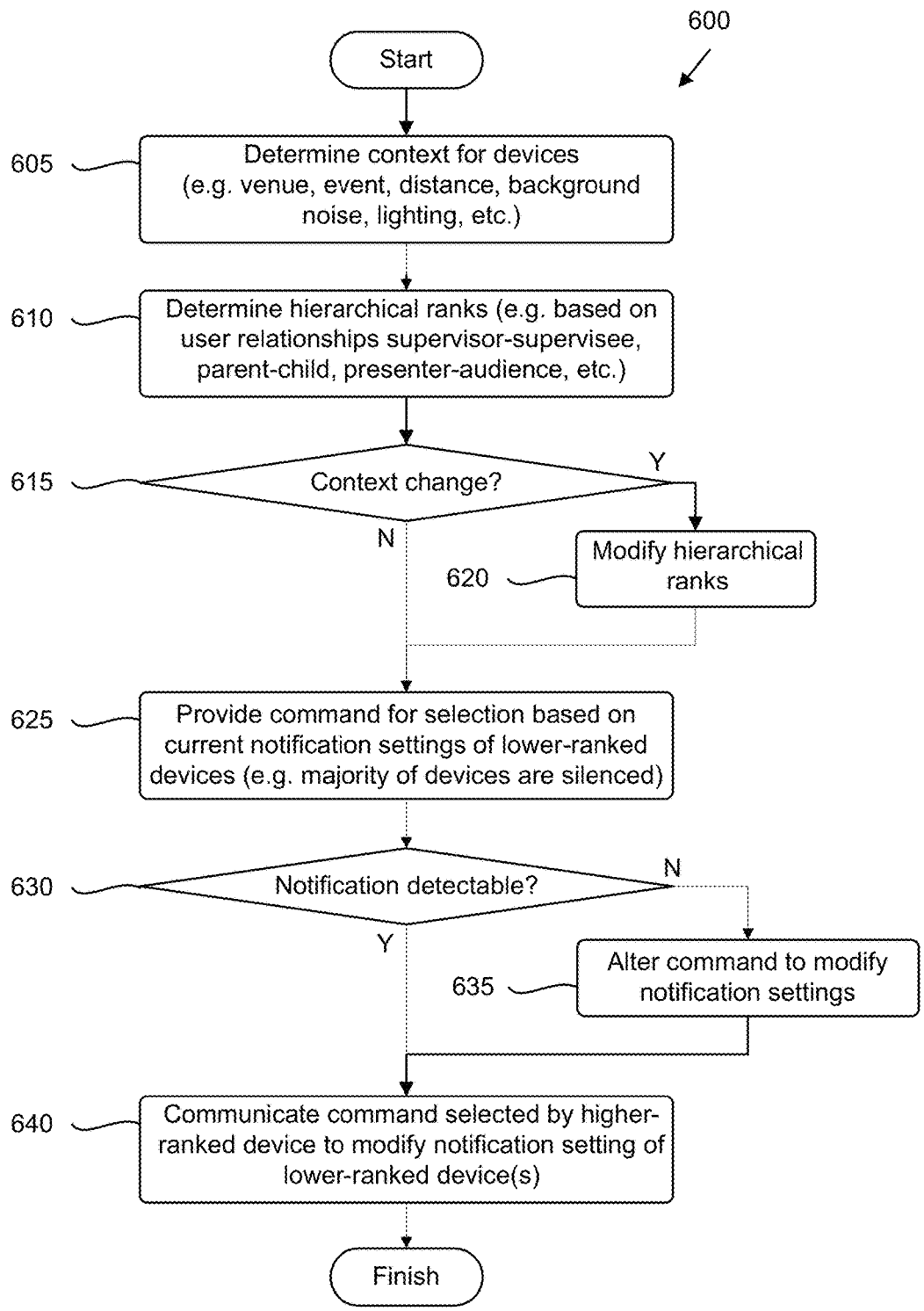
FIG. 6 is a schematic flow diagram of a further method for hierarchically managing mobile device notifications.

FIG. 6 is a schematic flow diagram of a further method 600 for hierarchically managing mobile device notifications.

In one embodiment, the method 600 includes determining 605 a context for a plurality of mobile devices. The method 600 further includes determining 610, for the context, a hierarchical ranking for the plurality of mobile devices wherein a first mobile device of the plurality of mobile devices is higher-ranked than at least one second mobile device of the plurality of mobile devices. In some embodiments, determining 605 a context and determining 610 a hierarchical ranking which may, in some embodiments, be done substantially as described above with respect to method 500 described above and depicted in FIG. 5.

In some embodiments, the method 600 determines 610 a hierarchical ranking based on a predetermined relationship between a first user that uses the higher-ranked first mobile device and second users that each use one of the at least one second mobile device. For example, the relationship may be a management-employee relationship, a presenter-audience relationship, a teacher-student relationship, supervisor-supervisee relationship, and/or a proprietor-guest relationship. Many of these relationships have and inherent or inferable hierarchical structure that may be determined by the notification controller, such as notification controller 110, in some cases utilizing a data management platform or a cognitive computing platform to help identify hierarchical relationships.

In some embodiments, the context may include a venue location, and event type, a distance between higher-ranked first mobile device and the at least one second mobile device, a venue lighting status, user activity, and a venue background noise level. Various examples of context elements are provided above in the description with respect to FIGS. 1, 2, 3A, 3B, 4, and 5.

In some embodiments, the method 600 further includes modifying 620 the hierarchical ranking based on a change 615 in the context. For example, referring to FIG. 3A, if for example the notification controller 110 initially determines that the mobile device 312 of the treasurer 310 has the same rank as the mobile device 308 of the vice president 306 in a meeting being conducted by the president 302. The notification controller 110 may modify the hierarchical ranking based on a change in the context when the president 302 excuses herself from the meeting to attend to other business. For example, the notification controller 110 may be programmed to determine one of the mobile devices as having the highest rank.

Similarly, referring to FIG. 3B if the second parent 302 has selected a command to modify notifications of lower-ranked devices wall the second parent 352 is sleeping, the notification controller 110 may be programmed to rank the mobile device 358 of the first parent 356 higher than the mobile device 354 of the second parent 352. A changing context may be recognized by the notification controller 110 based on activity on the mobile device 354 that the second parent 352 is done sleeping and thus. The method 600 may then modify 620 the hierarchical ranking to rank the mobile device 354 of the second parent 352 as equal to or higher than the mobile device 358 of the first parent 356 based on that context change.

In some embodiments, the method 600 provides 625 a command for selection by the higher-ranked mobile device based on current notification settings of one or more mobile devices of the plurality of mobile devices meeting a predetermined condition. The method 600 may include accessing notification settings of some or all of the plurality of mobile devices. In some embodiments, the predetermined condition is met by a majority of the plurality of mobile devices having a predetermined selection of notification settings in common.

For example, a family or another group which have devices that are hierarchically ranked by the method 600 may be attending a particular event or a particular venue. If most of the plurality of mobile devices are set to be silent, the notification controller 110 may provide 625 a command for selection by the higher-ranked mobile device based on the current notification settings in common, e.g., the silent setting. In some embodiments, providing 625 a command for selection may be done by prompting a user of the higher-ranked mobile device with a prompt such as "most of the devices in this venue are currently set in silent mode, would you like to send a command to modify to silence other devices in your group?"

In some embodiments, the method 600 may further include altering 635 the command to modify one or more notification settings in response to determining 630 that a notification from one or more of the lower-ranked mobile devices falls below a predetermined threshold of detectability at the higher-ranked first mobile device that selects the command. In other words, a user of a higher-ranked mobile device may communicate with the notification controller 110 to alter, for example, a the command to modify volume setting or a brightness setting to account for differences in detectability of the notifications by a user of the higher-ranked mobile device. For example, in the residential setting described in FIG. 3B, the command to modify the volume setting of the first child may be altered for the second child who is located more remotely from the higher-ranked mobile device of the first parent who is selecting the command.

In some embodiments, the method includes communicating a command selected by the higher-ranked first mobile device to modify levels of particular notification settings (e.g. notification volume settings, notification brightness settings, and/or notification vibration settings) to second mobile devices that are lower-ranked than the first mobile device. The levels may be such that the notifications are detectable by each of the users of each of the second mobile devices but are not detectable by the first mobile device. Notification level optimization may be performed using the interval halving method described above or by other optimization methods known in the art The method 600 may further include, in some embodiments, communicating 640 the command selected by the hiring device to modify notification settings of the lower-ranked devices. In some embodiments, the command to modify the one or more notification settings may include one or more notification settings selected from the group consisting of notification volume, notification brightness, and notification vibration.

Although the system and embodiments described above emphasize the perspective of the cloud-based notification controller, corresponding methods and systems may emphasize the perspective of the mobile devices including higher-ranked mobile devices and/or lower-ranked mobile devices.

For example, in some embodiments, a method may comprise determining by a first device a command to modify one or more notification settings of one or more lower-ranked mobile devices and communicating a command to a plurality of mobile devices, wherein each of the plurality of mobile devices receives the command in response to the first device having a higher rank of hierarchical ranking than each device of the plurality of mobile devices where the command modifies one or more notification settings of each device of the plurality of mobile devices.

In other embodiments the method may comprise receiving a command at a plurality of mobile devices, wherein each device of the plurality of mobile devices receives the command from a first device in response to the first device having a higher rank of hierarchical ranking than each device of the plurality of mobile devices, and the command modifies one or more notification settings of each device of the plurality of mobile devices.

The methods 500 and 600 may utilize the system complements and data elements described above with respect to any of FIGS. 1, 2, 3A, 3B, and 4. Moreover, the systems and methods described herein may be embodied in a program product. The program product may include a computer readable storage medium that stores code executable by one or more processors to perform the methods described herein.

In some embodiments, the code may be executable by the one or more processors to perform determining a context for plurality of mobile devices, determining for the context, a hierarchical ranking for the plurality of mobile devices wherein a first mobile device of the plurality of mobile devices is higher-ranked than at least one second mobile device of the plurality of mobile devices, and communicating a command selected by the higher-ranked first mobile device to modify one or more notification settings of the at least one second mobile device that is lower-ranked than the first mobile device.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
a notification controller comprising one or more processors; and
a memory storing code that is executable by the notification controller to:
determine a context for a plurality of mobile devices;
determine, for the context, a hierarchical ranking for the plurality of mobile devices wherein a first mobile device of the plurality of mobile devices is higher-ranked than at least one second mobile device of the plurality of mobile devices; and
communicate a command selected by the higher-ranked first mobile device to modify a detectability of one or more notification settings of the at least one second mobile device that is lower-ranked than the first mobile device.

2. The system of claim 1, wherein the code is further executable to modify a magnitude of the detectability of the one or more notification settings.

3. The system of claim 1, wherein the notification controller determines the hierarchical ranking based on a predetermined relationship between a first user that uses the higher-ranked first mobile device and second users that each use one of the at least one second mobile devices.

4. The system of claim 3, wherein the predetermined relationship of the first user and the second users is selected from the group consisting of a management-employee relationship, a presenter-audience relationship, a teacher-student relationship, supervisor-supervisee relationship, and a proprietor-guest relationship.

5. The system of claim 1, wherein the code is further executable by the notification controller to:
   alter the command to modify the one or more notification settings in response to determining that a notification from the at least one second mobile device falls below a predetermined threshold of detectability at the higher-ranked mobile device that selects the command.

6. The system of claim 5 wherein the notification controller alters the command to modify the one or more notification settings to include an optimized volume setting for the context.

7. The system of claim 1, wherein the command to modify the one or more notification settings includes one or more notification settings selected from the group consisting of notification volume, notification brightness, and notification vibration.

8. The system of claim 1, wherein the code is further executable by the notification controller to:
   provide the command for selection by the higher-ranked first mobile device based on current notification settings of one or more mobile devices of the plurality of mobile devices meeting a predetermined condition.

9. The system of claim 8, wherein the predetermined condition is met by a majority of the plurality of mobile devices within the context having a predetermined selection of notification settings in common.

10. The system of claim 1, wherein the context comprises one or more of a venue location, an event type, a distance between the higher-ranked first mobile device and the at least one second mobile device, a venue lighting status, user activity, and a venue background noise level.

11. A method comprising:
    determining a context for a plurality of mobile devices;
    determining, for the context, a hierarchical ranking for the plurality of mobile devices wherein a first mobile device of the plurality of mobile devices is higher-ranked than at least one second mobile device of the plurality of mobile devices; and
    communicating a command selected by the higher-ranked first mobile device to modify a detectability of one or more notification settings of the at least one second mobile device that is lower-ranked than the first mobile device.

12. The method of claim 11, wherein modifying the detectability of the one or more notification settings includes modifying a magnitude of the detectability of the one or more notification settings.

13. The method of claim 11, further comprising:
    determining the hierarchical ranking based on a predetermined relationship between a first user that uses the higher-ranked first mobile device and second users that each use one of the at least one second mobile devices.

14. The method of claim 13, wherein the predetermined relationship of the first user and the second users is selected from the group consisting of a management-employee relationship, a presenter-audience relationship, a teacher-student relationship, supervisor-supervisee relationship, and a proprietor-guest relationship.

15. The method of claim 11, further comprising:
    altering the command to modify the one or more notification settings in response to determining that a notification from the at least one second mobile device falls below a predetermined threshold of detectability at the higher-ranked mobile device that selects the command.

16. The method of claim 15, wherein the command to modify the one or more notification settings includes one or more notification settings selected from the group consisting of notification volume, notification brightness, and notification vibration.

17. The method of claim 11, further comprising:
    providing the command for selection by the higher-ranked first mobile device based on current notification settings of one or more mobile devices of the plurality of mobile devices meeting a predetermined condition.

18. The method of claim 17, wherein the predetermined condition is met by a majority of the plurality of mobile devices having a predetermined selection of notification settings in common.

19. The method of claim 11, wherein the context comprises one or more of a venue location, an event type, a distance between the higher-ranked first mobile device and the at least one second mobile device, a venue lighting status, user activity, and a venue background noise level.

20. A program product comprising a non-transitory computer readable storage medium that stores code executable by one or more processors to perform:
    determining a context for a plurality of mobile devices;
    determining, for the context, a hierarchical ranking for the plurality of mobile devices wherein a first mobile device of the plurality of mobile devices is higher-ranked than at least one second mobile device of the plurality of mobile devices; and
    communicating a command selected by the higher-ranked first mobile device to modify a detectability of one or more notification settings of the at least one second mobile device that is lower-ranked than the first mobile device.

* * * * *